US010387280B2

(12) United States Patent
Wong (10) Patent No.: US 10,387,280 B2
(45) Date of Patent: Aug. 20, 2019

(54) REPORTING DEFECTS IN A FLASH MEMORY BACK-UP SYSTEM

(71) Applicant: INTERNATIONAL BUSINESS MACHINES CORPORATION, Armonk, NY (US)

(72) Inventor: Kelvin Wong, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 15/619,195

(22) Filed: Jun. 9, 2017

(65) Prior Publication Data

US 2018/0357142 A1     Dec. 13, 2018

(51) Int. Cl.
| | |
|---|---|
| *G06F 11/00* | (2006.01) |
| *G06F 11/20* | (2006.01) |
| *G06F 11/14* | (2006.01) |
| *G06F 12/10* | (2016.01) |

(52) U.S. Cl.
CPC ...... *G06F 11/2094* (2013.01); *G06F 11/1451* (2013.01); *G06F 11/1469* (2013.01); *G06F 12/10* (2013.01); *G06F 2201/805* (2013.01); *G06F 2201/82* (2013.01); *G06F 2212/1008* (2013.01); *G06F 2212/1032* (2013.01); *G06F 2212/2022* (2013.01); *G06F 2212/657* (2013.01)

(58) Field of Classification Search
CPC ............. G06F 11/1451; G06F 11/1469; G06F 11/2094; G06F 12/10
See application file for complete search history.

(56) References Cited

U.S. PATENT DOCUMENTS

| | | | |
|---|---|---|---|
| 5,802,551 | A | 9/1998 | Komatsu et al. |
| 8,484,522 | B2 | 7/2013 | Flynn et al. |
| 8,560,922 | B2 | 10/2013 | Bivens et al. |
| 8,996,907 | B2 | 3/2015 | Gyllenskog et al. |
| 9,128,822 | B2 | 9/2015 | Michael et al. |
| 9,348,708 | B2 | 5/2016 | Jung et al. |
| 9,501,356 | B2 * | 11/2016 | Palmer ................ G06F 12/0246 |

(Continued)

FOREIGN PATENT DOCUMENTS

| | | |
|---|---|---|
| EP | 2249243 A1 | 11/2010 |
| GB | 2507961 A | 5/2014 |

OTHER PUBLICATIONS

Author(s): Dongho Kang, Keewon Cho, Sungho Kang,"A new in-field bad block detection scheme for NAND flash chips." Source: SoC Design Conference (ISOCC), 2015 International. URL: http://ieeexplore.ieee.org/abstract/document/7401657/.

*Primary Examiner* — Joshua P Lottich
(74) *Attorney, Agent, or Firm* — Michael R. Long; Robert Sullivan (57) ABSTRACT

Techniques for reporting defects in a flash memory back-up system include organizing backed-up data into multiple stripes of a logical block address (LBA). A stripe is a set of pages across all available flash memory devices which have the same block and page address. In response to encountering an error in a block of flash memory during back-up of a stripe of data in one or more last pages of a logical block address, the stripe of data is re-written at a page address in the next LBA and preceding LBA metadata is embedded for the stripe of backed-up data in the re-written stripe of data in the next LBA including an indication of the location of new error block in the preceding LBA.

20 Claims, 8 Drawing Sheets

(56) References Cited

U.S. PATENT DOCUMENTS

| | | | |
|---|---|---|---|
| 9,501,404 B2 * | 11/2016 | Palmer | G06F 11/1441 |
| 9,632,715 B2 * | 4/2017 | Palmer | G06F 12/0868 |
| 2004/0123202 A1 * | 6/2004 | Talagala | G06F 11/1076 |
| | | | 714/736 |
| 2012/0159289 A1 | 6/2012 | Piccirillo et al. | |
| 2013/0173954 A1 | 7/2013 | Woo et al. | |
| 2014/0201429 A1 * | 7/2014 | Tal | G06F 12/0246 |
| | | | 711/103 |
| 2015/0052393 A1 * | 2/2015 | Palmer | G06F 12/0246 |
| | | | 714/15 |
| 2015/0317210 A1 * | 11/2015 | Palmer | G06F 11/1441 |
| | | | 714/6.3 |
| 2018/0165169 A1 * | 6/2018 | Camp | G06F 11/2069 |
| 2018/0181476 A1 * | 6/2018 | Gunnam | G06F 11/2094 |
| 2018/0356998 A1 * | 12/2018 | Wu | G06F 3/0619 |

\* cited by examiner

REPORTING DEFECTS IN A FLASH MEMORY BACK-UP SYSTEM

BACKGROUND

The present disclosure relates to flash memory back-up systems, and more specifically, to reporting defects in a flash memory back-up system.

When main power fails in a system a pre-charged standby capacitor keeps the system power on long enough for data to transfer from system memory to NAND flash memory. NAND flash memory is a type of non-volatile storage that does not require power to retain data. A flash controller system reads data from volatile memory and stores that data amongst one or more flash devices. Each distinct flash device is known as a channel.

Any such back-up mechanism must deal with and manage one of NAND flash technology's innate problems: namely, that blocks eventually wear out due to excessive program and erase cycles. As NAND flash geometries shrink this problem becomes even more severe. It is a likely possibility that the back-up mechanism will encounter one of these worn out blocks in the course of saving data and, the fact that this block is worn will not have been known prior to starting the back-up.

When one of these so-called "Grown Bad Blocks" is encountered the mechanism is expected to re-direct the data to be saved to another unworn out area of NAND flash. The mechanism should also record the position of this newly discovered bad block so that the user may be notified of its presence and can take it into account during future management or maintenance of the NAND flash memory.

SUMMARY

A technique for reporting defects in a flash memory back-up system includes organizing backed-up data into multiple stripes of a logical block address (LBA). A stripe is a set of pages across all available flash memory devices which have the same block and page address. In response to encountering an error in a block of flash memory during back-up of a stripe of data in one or more last pages of a logical block address, the stripe of data is re-written at a page address in a next LBA and preceding LBA metadata for the stripe of backed-up data in the re-written stripe of data is embedded in the next LBA including an indication of the location of new error block in the preceding LBA.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention are described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Figure 1:
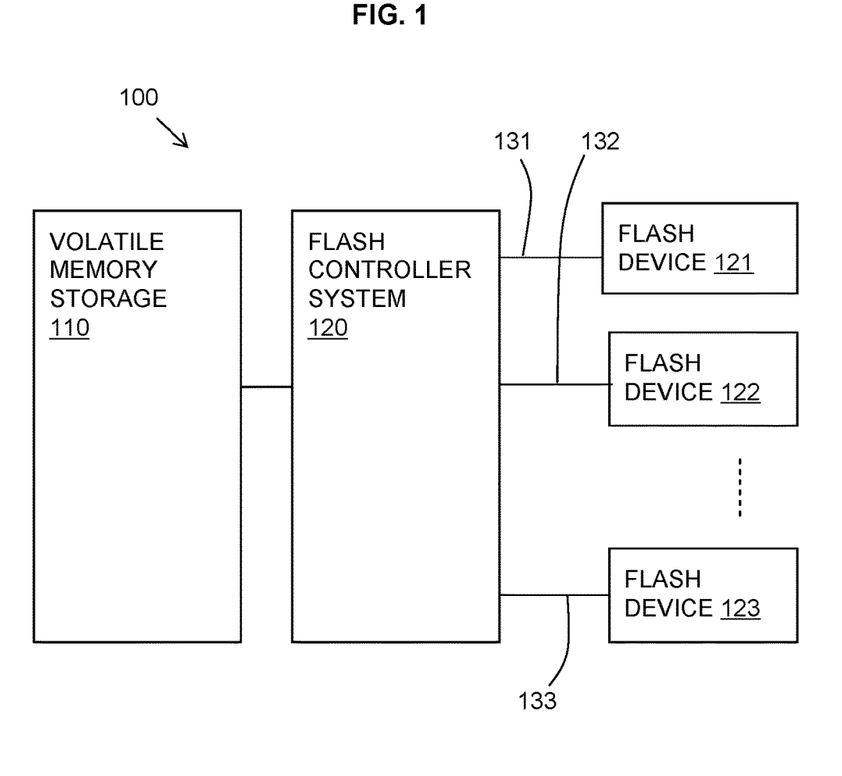
FIG. 1 is a block diagram of an example embodiment of a flash memory back-up system in accordance with the present disclosure.

Referring to FIG. 1, an example embodiment of a back-up memory system 100 is shown. Volatile memory storage 110 may be backed up to multiple flash devices 121-123. The back-up memory system 100 has a flash controller system 120 for controlling multiple flash devices 121-123. Each flash device 121-123 has a flash interface 131-133 with the flash controller system 120. In this description, each distinct flash device 121-123 is referred to as a channel.

U.S. Pat. No. 9,501,404 discloses a method and system for back-up of data to flash memory. Backed-up data is organized into stripes, in which a stripe is a set of pages across all available flash memory devices that have a same block and page address. Responsive to encountering an error in a block of flash memory during back-up of a stripe of data, the stripe of data is re-written starting at a next available page address and excluding the page of flash memory for the block having the error. Subsequent stripes of data are written in the block to pages excluding the page of flash memory for the block having the error. Metadata is embedded for a stripe of backed-up data including: an identification number of the stripe of data; a stripe length field of the amount of data saved in a stripe; an indication of the location of new error block; and an indication of known error blocks.

The described method and system reporting bad blocks of pages found at the end of an LBA may be used as an extension to the method described in U.S. Pat. No. 9,501,404 and it is described below in this context. However, the described method and system of reporting bad blocks of pages found at the end of an LBA may also be used in other situations or with other flash back-up and restoration methods.

Flash devices 121-123 are divided into dies and each die has two planes. Each plane consists of a certain number of blocks (usually multiples of 1K) and each block has a certain number of pages (usually multiples of 128). Each page holds a given payload of data. It is also possible to control multiple flash devices 121-123 simultaneously through separate interfaces 131-133 as shown in FIG. 1. In this description, each distinct flash device 121-123 is known as a channel.

The described method uses a concept of a "stripe", which consists of all the pages in every available plane and in every available channel that have the same page address and block address.

Figure 2:
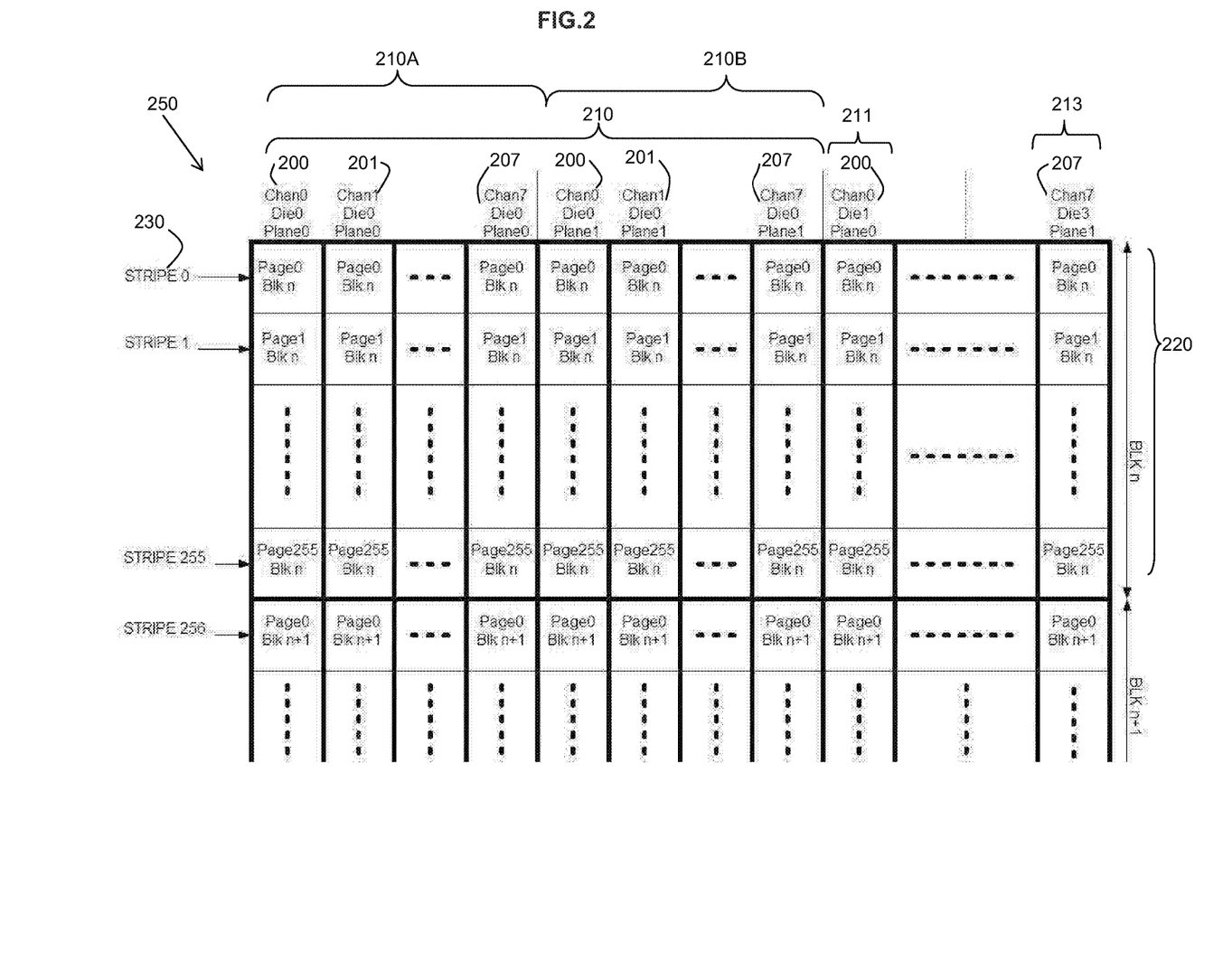
FIG. 2 is a schematic diagram of an example embodiment of flash memory showing stripes of data in accordance with an aspect of the present disclosure.

Referring to FIG. 2, a schematic diagram 250 shows an example embodiment of several stripes that reside at various page and block addresses in a flash memory system.

In this example embodiment, there are eight active channels 200-207 (numbered 0 to 7) with each channel containing four dies 210-213 (numbered 0 to 3). Given that there are two planes 210A, 210B per die, a single stripe consists of 64 pages. In addition, each block 220 on a plane consists of 256 pages. Thus across all channels, dies and planes, there can be 256 stripes 230 (0 to 255) per logical block address (LBA).

Each stripe 230 is a set of pages across all available flash devices which has the same block and page address across all the channels, dies and planes.

A back-up process is described using the example of FIG. 2. It is assumed that the data to be backed up to flash memory (the source data) exists in a contiguous memory space within the system.

Back-up begins by copying enough source data to fill 64 flash pages in Stripe 0, then doing the same for Stripe 1, and so on until all the required data has been backed up with a last Stripe X (for page x, block n). When this occurs, an end marker stripe is written at the next available page address (at page x+1, block n).

When power is restored, the saved data in flash memory can be copied back into a target location in system memory. This data restore begins by reading the flash data from Stripe 0 and writing it to this target location. The data from Stripe 1 is then read and copied to the next part of target space and so on. The restore operation finishes when the end marker is read.

In order to adapt to errors during the back-up process and in order to log the locations of flash blocks that have become bad or unusable, the described method writes a set of metadata into each page of each stripe (the remainder of a page may be filled up with source data). The metadata consists of the following:

Stripe Number—beginning from 0 and usually incrementing with each stripe. However, newly discovered bad blocks can cause page program errors. When these are encountered, the method may have to back track a little and re-write stripes at a later location. Thus, it is possible for a flash image to contain two or mores stripes which have the same stripe number. (Note that it is not possible to overwrite a piece of flash memory once it has been written without performing a complete erase of a block. A stripe re-write must therefore be done on a "fresh" piece of flash memory).

Stripe Size—This is the amount of backed up data contained within the stripe. The end marker is denoted by this field being zero.

Known Bad Pages Map—This is a bitmap which has one bit to represent every page in the stripe. If a bit is on, it indicates that the corresponding page in the stripe is known (before the back-up operation begins) to belong to a bad block. Manufacturers provide a list for each flash device sold indicating the locations of each block known to be unusable within the device.

Grown Bad Pages Map—This is also a bitmap which has one bit to represent every page in the stripe. If a bit is on, it indicates that a particular page in the stripe belongs to a block that was discovered to be bad some time during the back-up operation. This block was not included in the original bad block list provided by the flash manufacturer.

Figure 3:
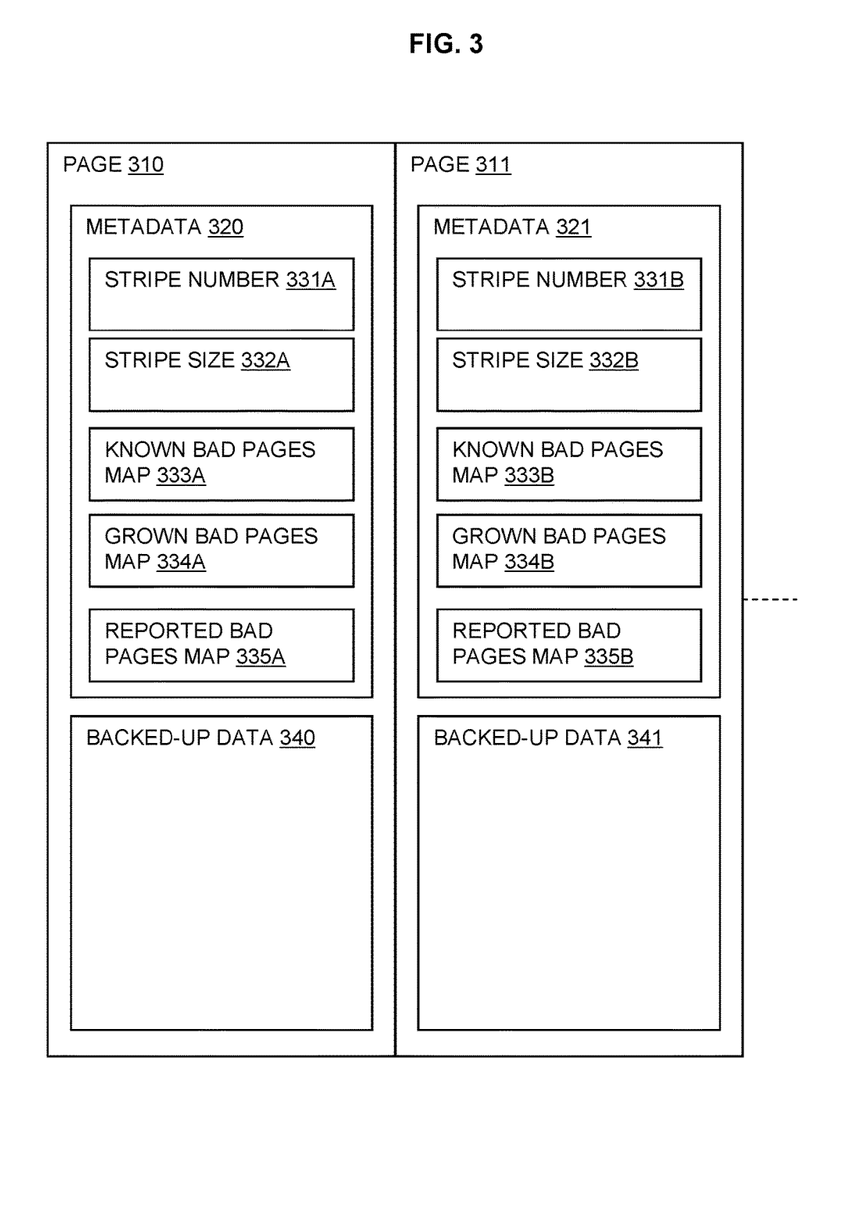
FIG. 3 is a schematic diagram of an example embodiment of a flash memory in accordance with an aspect of the present disclosure.

Referring to FIG. 3, a schematic diagram shows the data stored in each of the pages of a stripe 230 across multiple channels of flash devices, i.e. each page with the same page and block address.

The first two pages 310, 311 are shown in a stripe 230. Each page 310, 311 in a stripe 230 includes a set of metadata 320, 321 including a stripe number 331A, 331B, a stripe size 332A, 332B for the amount of data saved in a stripe which may be changed if bad blocks are encountered or known about, a known bad pages map 333A, 333B in the form of a bitmap of known bad blocks, and a grown bad pages map 334A, 334B in the form of a bitmap of grown bad blocks. The pages 310, 311 also include the backed-up data 340, 341 with the backed-up data 341 of the second page 311 following on from the backed-up data 340 of the first page 310.

The size of the metadata stored in each page is typically very small compared to the available payload of a page. The exact size of the metadata depends on the exact configuration of flash memory used.

In order to efficiently use the time provided by the capacitors during a power-down, various embodiments of U.S. Pat. No. 9,501,404 may attempt to write multiple stripes at a time. This includes the scenario where the later stripes have to be written on the next LBA whilst earlier stripes are still completing on the preceding LBA.

The metadata embedded in each page of the back-up image called Grown Bad Pages map 334A, 334B is a bitmap which has one bit representing every page in the stripe. If a bit is on, it indicates that a particular page in the stripe belongs to a block that was discovered to be bad during the back-up. When a Grown Bad Pages map is written in a particular LBA it indicates the locations of bad blocks in that LBA alone.

If a Grown Bad Block is discovered on the last page address of the LBA then it is too late to record the presence of this defect. This is because once a flash page has been programmed its contents cannot be altered in anyway unless the entire block it belongs to (and ALL of its pages) is erased. Therefore, being the last page address, the current LBA will have no more stripes in which to record the Grown Bad Block in subsequent metadata maps. The Grown Bad Pages maps of stripes in the next LBA can only record the presence of defects in that next LBA, not the current one.

If another embodiment of U.S. Pat. No. 9,501,404 is used in which two stripes are being written at a time, then any Grown Bad Blocks discovered whilst writing to the final two page addresses of the LBA will not get recorded. Further embodiments may have more stripes that are "in flight".

Information on newly formed flash defects detected whilst writing to the final pages of an LBA's address is reported as described below.

Referring again to FIG. 3, the described method and system add an additional piece of metadata to the pages 310, 311 called a Reported Bad Pages map 335A, 335B to the set of metadata 320, 321. The Reported Bad Pages map (if, for example, written in a stripe in LBA n+1) records if any planes had bad pages in the last few page addresses of the preceding LBA (i.e. LBA n). This additional piece of metadata thus prevents information on the location of previously unknown defective pages in the last few page addresses of an LBA from being lost. This metadata may be referred to as preceding LBA metadata as it is metadata relating to the preceding LBA.

The Reported Bad Pages map 335A, 335B may be a bitmap that has one bit for every page in the stripe. If a bit is on, it indicates that a page in one of the stripes in the preceding LBA belongs to a block that was discovered to be bad some time during the writing of that stripe. The bit position will indicate channel, die and plane addresses.

Figure 4:
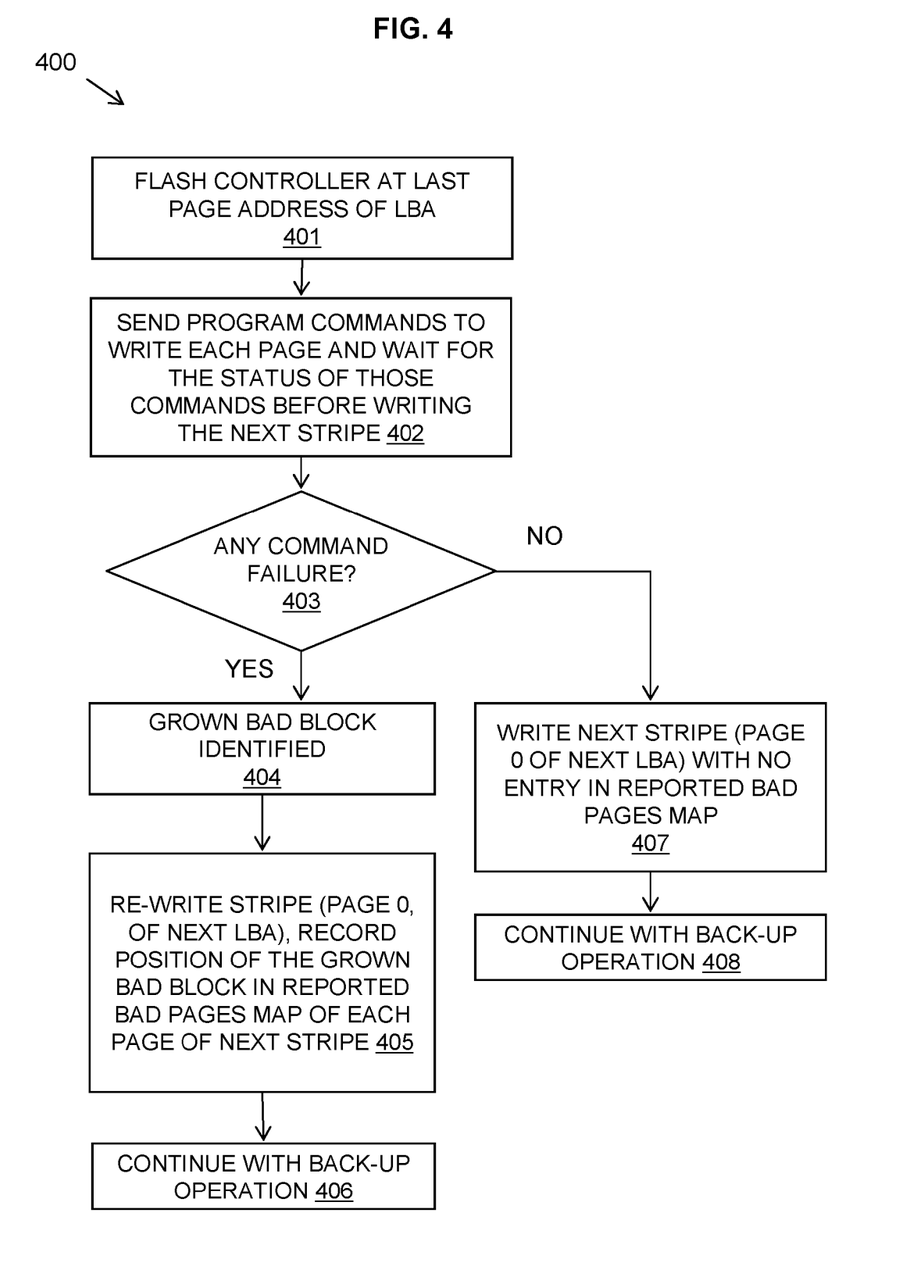
FIG. 4 is a flow diagram of an example embodiment of an aspect of a method in accordance with the present disclosure.

Referring to FIG. 4, a flow diagram 400 shows a first example embodiment of a described method of backing-up data and reporting bad pages in which one stripe of data is written at a time. The method may be carried out by a flash controller system.

When the flash controller system gets to 401 the last page address of an LBA, it may send 402 program commands to write each page and wait for the status of those commands before writing the next stripe.

The method may determine 403 if there are any command failures. Should any program command fail, and thus a Grown Bad Block is present and identified 404, then the stripe is re-written 405 that was originally written on the last page of the address of the previous LBA in the first stripe at page address 0 of the next LBA. The controller may record the position of the Grown Bad Block (from the previous LBA) in the Reported Bad Pages map of each page of this next stripe. The controller then continues 406 with the back-up process. This may be as described in U.S. Pat. No. 9,501,404 or an alternative back-up method.

If there are no command failures, the controller may continue 407 to write the next stripe with no entry in the Reported Bad Pages map. The controller then continues 408 with the back-up process.

When reporting the data from the flash devices, the flash controller system may read the Reported Bad Pages map to see if there were any Grown Bad Blocks in the preceding LBA that were not recorded by any of the Grown Bad Pages maps of stripes in that preceding LBA. The location of these Grown Bad Blocks may then be reported back to the user.

In order to report all defects in any given LBA the information in the Grown Bad Plane maps within that LBA is combined with the Reported Bad Plane maps within the next LBA (if applicable). In practice, this may be by a logical OR of the Grown Bad Plane bitmaps in LBA n with the Reported Bad Plane bitmaps in LBA n+1.

The reported defects in any given LBA, as gathered from the metadata of Grown Bad Blocks in that LBA and the metadata of Reported Bad Blocks in the next LBA, may be used for restoration of the backed-up data or for other uses where bad blocks require identification.

FIG. 4 describes the method as carried out when a single stripe of data is written at a time. Other embodiments may back-up data by writing two or more stripes of data at a time. In these embodiments, if m stripes of data are written concurrently, any of the last m stripes of an LBA that encounter a new error are re-written to a new stripe in the next LBA together with metadata reporting the new error blocks in any of the last m stripes.

Figure 5A:
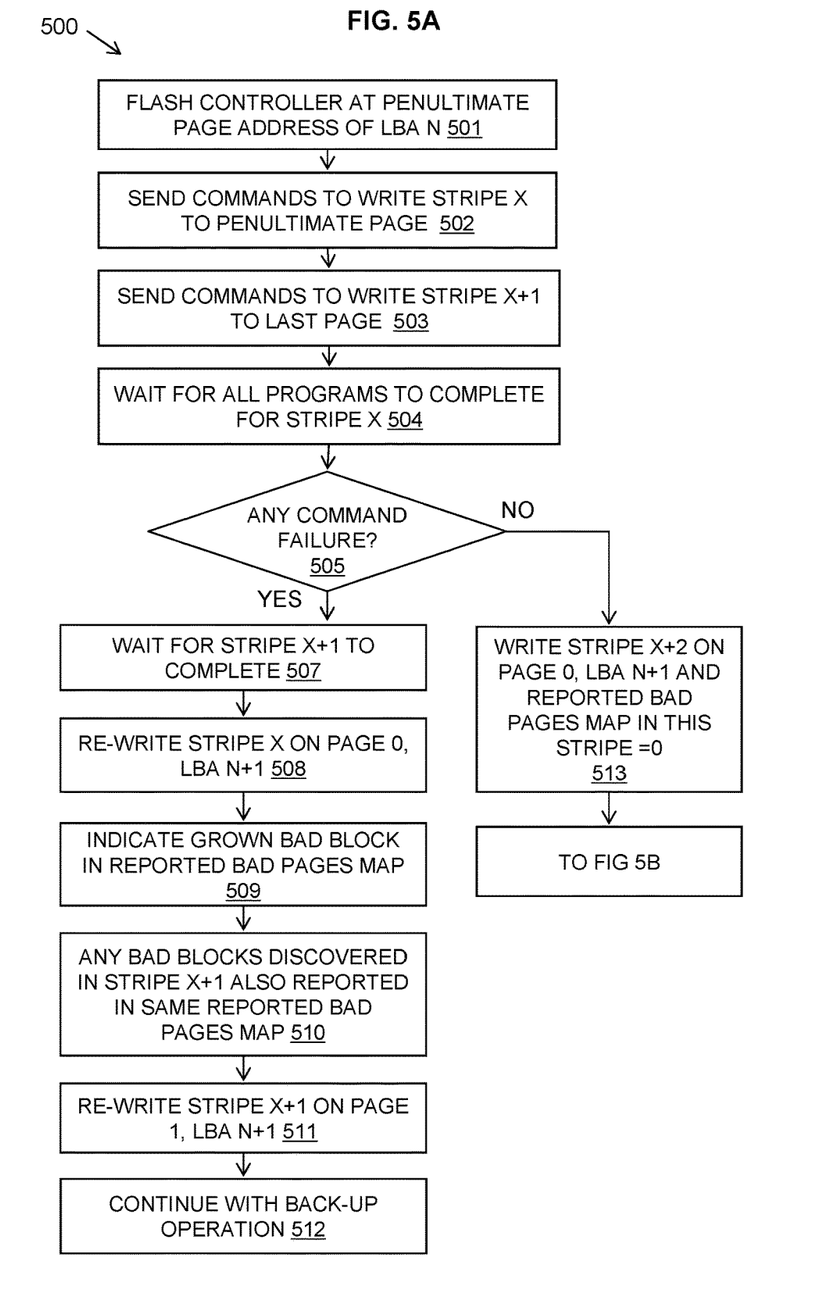
FIGS. 5A and 5B are flow diagrams of an example embodiment of another aspect of a method in accordance with the present disclosure.
Figure 5B:
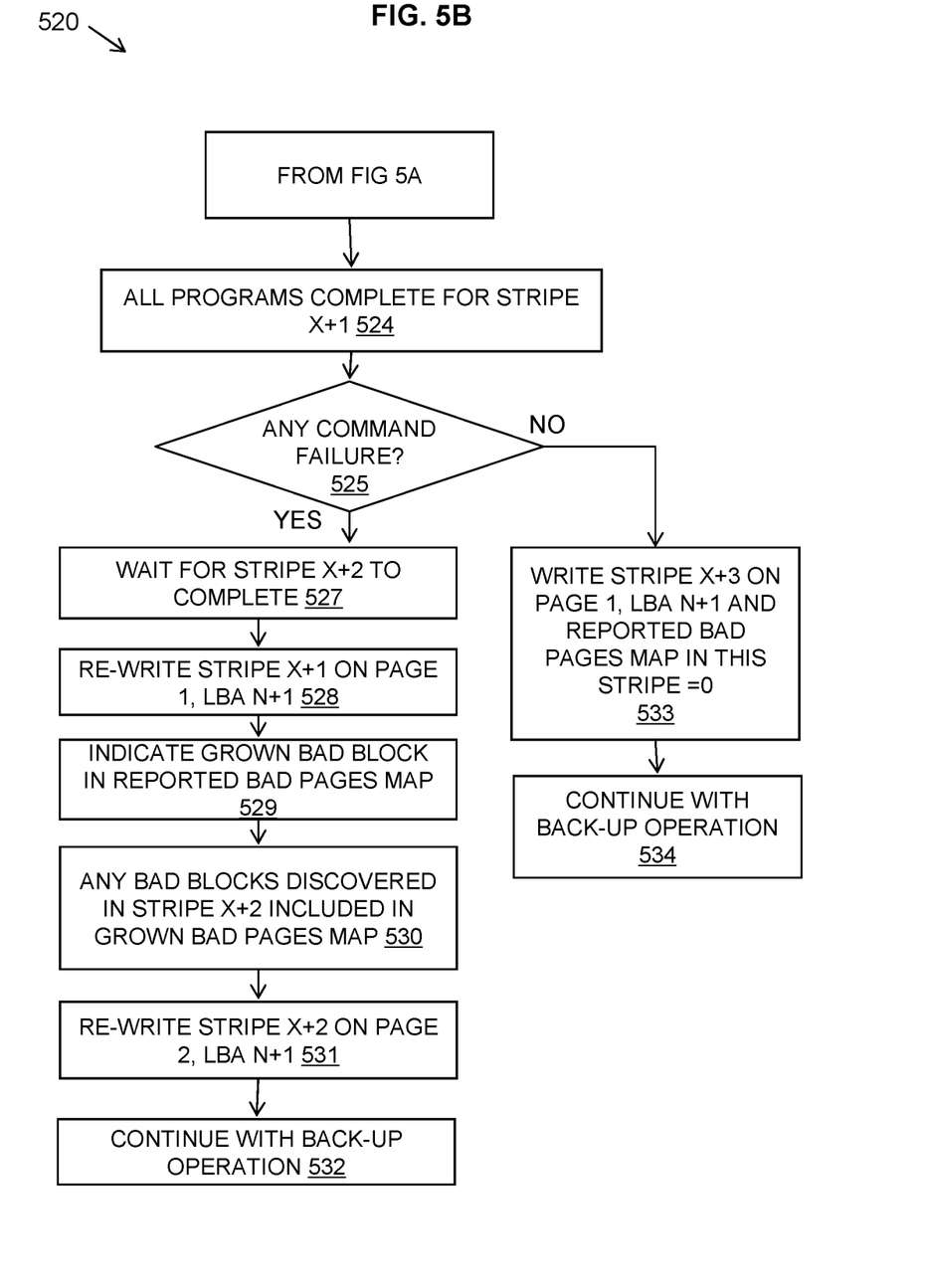

Referring to FIGS. 5A and 5B, a flow diagrams 500, 520 shows a second example embodiment of a described method of backing-up data and reporting bad pages in which two stripes of data is written at a time. It will be appreciated that the described method may be extended to write three or more stripes of data at a time.

In a process where two stripes of data are being written at a time, the flash controller system may reach 501 the penultimate page address of an LBA the procedure would be as follows. For example, the LBA is LBA n with 128 pages per block (pages 0 to 127), therefore the penultimate page is page 126, and the last page is page 127.

When the flash controller system gets to the penultimate page address 126 of LBA n, it sends 502 commands to write stripe x. Some time later, it sends 503 commands to write stripe x+1 to the last page address 127 (last page address of LBA n). Since it has not completed yet, it is not known whether stripe x has encountered any Grown Bad Blocks.

The flash controller system waits 504 until all programs are complete for stripe x. It may then determine 505 if any command failures occurred.

If a defect was found, then the controller may wait 507 until stripe x+1 has completed. It will then re-write 508 stripe x on page 0, LBA n+1 (for example, according to the method described in U.S. Pat. No. 9,501,404) and indicate 509 the position of the Grown Bad Block (discovered on writing page address 126, LBA n) in the Reported Bad Pages map.

In addition, any bad blocks discovered whilst writing stripe x+1 (on page address 127, LBA n) may also be reported 510 in the same Reported Bad Pages map. Stripe x+1 is then re-written 511 on page 1, LBA n+1 (for example, according to the method described in U.S. Pat. No. 9,501,404). The back-up operation may then proceed 512.

If no defects were found, then the controller writes 513 stripe x+2 on page 0, LBA n+1 and the Reported Bad Pages map in this stripe will be zero. The flash controller system then proceeds to the method shown in FIG. 5B.

FIG. 5B continues the method of the flash controller system from FIG. 5A and waits 524 until all programs are complete for stripe x+1. It is then determined 525 if any command failures occur.

If a defect is found in stripe x+1, then the controller waits 527 until stripe x+2 has completed. It then re-writes 528 stripe x+1 on page 1, LBA n+1 and indicates 529 the position of the new Grown Bad Block (discovered whilst writing to page address 127, LBA n) in the Reported Bad Pages map of this re-written stripe. Additionally, if a Grown Bad Block is subsequently discovered 530 during the writing of stripe x+2 then the Grown Bad Pages map of the stripe on page 1, LBA n+1 will indicate the position of this new, separate defect. Stripe x+1 is re-written 531 on page 2, LBA n+1.

The controller may then continue 532 with the back-up operation. Thus the Reported Bad Pages map indicates any defects in LBA n and simultaneously the Grown Bad Pages map indicates any defects in LBA n+1.

If no defects were found, then the controller writes 533 stripe x+3 on page 1, LBA n+1 and the Reported Bad Pages map will be zero. The back-up operation continues 534.

The described method improves on the reporting coverage of bad areas and this information may be used by other methods. For example, U.S. Pat. No. 8,996,907 uses a "Good/Bad" data structure to help determine where it is safe to store parity information that protects the data being saved. As described in U.S. Pat. No. 8,996,907 this data structure is based on knowing where the bad blocks are in first place. The described method enhances the reporting of where these bad blocks are located.

The described method and system does not have to spend significant time erasing new blocks whenever Grown Bad Blocks are discovered thereby improving the defect reporting capabilities makes the resulting solution's performance efficient.

U.S. Pat. No. 9,501,404 describes a high performance back-up method capable of writing multiple pages at once and thus is capable of updating its bad pages maps with multiple newly discovered bad pages concurrently. It does this "on-the-fly" as it is performing the back-up. The presently described method of reporting bad blocks of pages found at the end of an LBA may be used as an extension to U.S. Pat. No. 9,501,404, and it also is capable of updating the described Reported Bad Pages map with multiple new bad pages concurrently rather than one at a time.

Figure 6:
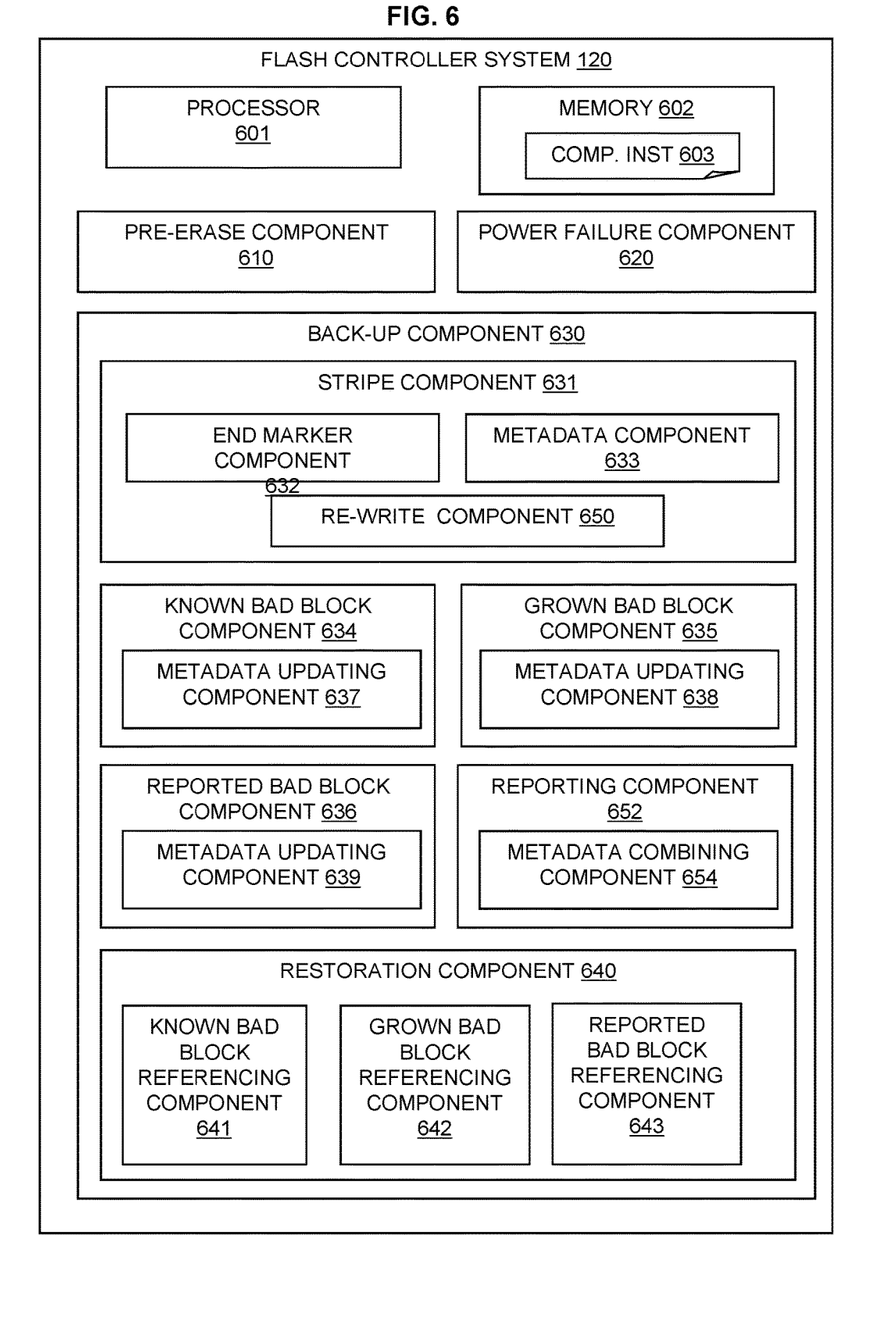
FIG. 6 is block diagram of an example embodiment of a system in accordance with the present disclosure.

Referring to FIG. 6, a block diagram shows an example embodiment of a flash controller system 120 for a memory back-up system.

The flash controller system 120 may include at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the components.

The flash controller system 120 may include a pre-erase component 610 for pre-erasing sufficient blocks from flash memory for the backed-up data. The flash controller system 120 may include a power failure component 620 for determining if a power failure has occurred. A back-up component 630 may be provided for backing-up the data during a temporary period of power provided by a temporary power source such as a charged capacitor.

The back-up component 630 may include a stripe component 631 for backing-up data in stripes including an end marker component 632 for inserting an end marker stripe to indicate the end of the backed-up data. The stripe component 631 may also include a metadata component 633 for including metadata for a stripe in each page of a stripe. The stripe component 631 may include a re-write component 650 for re-writing a stripe that encounters new error blocks.

The back-up component 630 may include a known bad block component 634 for accommodating known bad blocks in the back-up process. The back-up component 630 may also include a grown bad block component 635 for accommodating grown bad blocks in the back-up process. The back-up component 630 may also include a reported bad block component 636 for reporting bad blocks found in a last number of pages of an LBA in the metadata of pages in the next LBA.

The known bad block component 634 and the grown bad block component 635 may each contain a metadata updating component 637, 638 for updating the metadata in each page of a stripe if known bad blocks or grown bad blocks are encountered. The reporting bad block component 636 may include a metadata updating component 639 for updating the metadata in each page of a stripe of a next LBA if bad blocks found in a last number of pages of an LBA.

The back-up component 630 may include a reporting component 652 for reporting any defects in a given LBA including a metadata combining component 654 for combining information in current LBA metadata of grown bad blocks in an LBA n with preceding LBA metadata reporting grown bad pages in an LBA n+1.

A restoration component 640 may be provided including a known bad block referencing component 641 for accommodating known bad blocks in the restoration process, a grown bad block referencing component 642 for accommodating grown bad blocks in the restoration process, and a reported bad block referencing component 643 for accommodating reported bad blocks in the restoration process.

Figure 7:
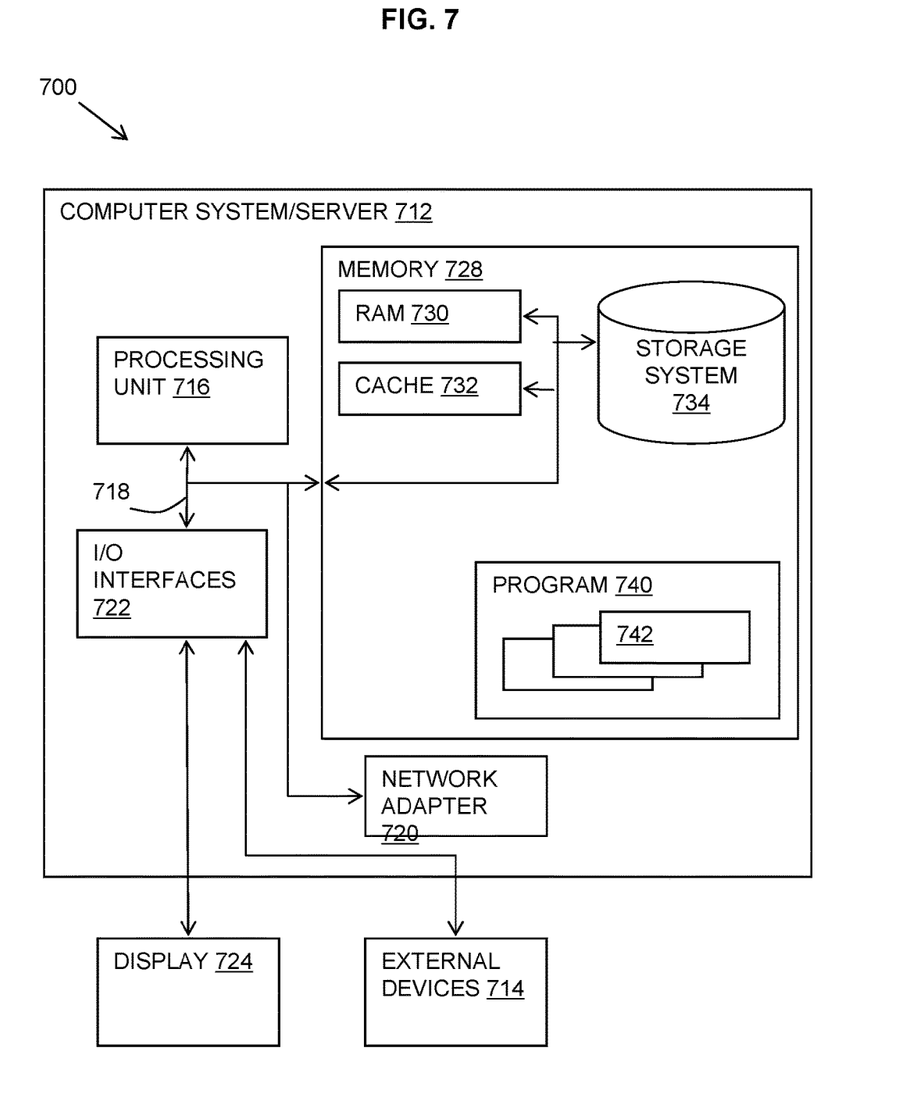
FIG. 7 is a block diagram of an embodiment of a computer system in which aspects of the present disclosure may be implemented.

Referring now to FIG. 7, a schematic of an example of a system 700 in the form of a computer system or server is shown.

A computer system or server 712 may be operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

In FIG. 7, a computer system/server 712 is shown in the form of a general-purpose computing device. The components of the computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for reporting defects in a flash memory back-up system, comprising:
   organizing backed-up data into multiple stripes of a logical block address (LBA), wherein a stripe is a set of pages across all available flash memory devices which have the same block and page address;
   when an error in a block of flash memory is encountered during back-up of a stripe of data in one or more last pages of a logical block address, the method includes:
   re-writing the stripe of data at a page address in the next LBA; and
   embedding preceding LBA metadata for the stripe of backed-up data in the re-written stripe of data in the next LBA including an indication of the location of new error block in the preceding LBA.

2. The method of claim 1, wherein the preceding LBA metadata includes a reported bad pages map in the form of a bitmap that has one bit for every page in one or the stripes in the preceding LBA and wherein the bit indicates that a page belongs to a block that is the location of a new error block.

3. The method of claim 1, wherein the one or more last pages are a number of last pages corresponding to a number of pages being written concurrently in a back-up operation.

4. The method of claim 1, including restoring backed-up data to target memory, including:
   reading all pages from a stripe of backed-up data to target memory, including reading metadata for a stripe embedded in the pages of a preceding LBA; and
   using the embedded preceding LBA metadata to allow for error blocks in the preceding LBA.

5. The method of claim 1, including when an error in a block of flash memory is encountered during back-up of a stripe of data in one or more non-last pages of a logical block address, the method includes:
   re-writing the stripe of data at a page address in the current LBA; and
   embedding current LBA metadata for the stripe of backed-up data in the re-written stripe of data in the current LBA including an indication of the location of new error block in the current LBA.

6. The method of claim 5, including:
   reporting any defects in an LBA by combining information in the current LBA metadata of grown bad blocks in a current LBA with the preceding LBA metadata reporting grown bad pages in a next LBA.

7. The method of claim 6, including carrying out a logical OR of the current LBA metadata in the form of a grown bad pages bitmap in LBA n with the preceding LBA metadata in the form of a reported bad pages bitmap of LBA n+1.

8. The method of claim 1, wherein one stripe of data is backed-up at a time and including:
   sending program commands for a last page address of an LBA and waiting for the status of commands before writing the next stripe;
   identifying any new error blocks; and
   writing the next stripe in the first page of the next LBA including the preceding LBA metadata.

9. The method of claim 1, wherein m stripes of data are backed up simultaneously, and any of the last m stripes of an LBA that encounter an error are re-written to a new stripe in the next LBA including preceding LBA metadata reporting new error blocks in the last m stripes.

10. A system for reporting defects in a flash memory back-up system, comprising:
    a processor and a memory configured to provide computer program instructions to the processor to execute the function of the components:
    a stripe component for organizing backed-up data into multiple stripes of a logical block address (LBA), wherein a stripe is a set of pages across all available flash memory devices which have the same block and page address;
    a reporting bad block component for determining when an error in a block of flash memory is encountered during back-up of a stripe of data in one or more last pages of a logical block address;
    a re-write component for re-writing the stripe of data at a page address in the next LBA; and
    a metadata component for embedding preceding LBA metadata for the stripe of backed-up data in the re-written stripe of data in the next LBA including an indication of the location of new error block in the preceding LBA.

11. The system of claim 10, wherein the preceding LBA metadata includes a reported bad pages map in the form of a bitmap that has one bit for every page in one or the stripes in the preceding LBA and wherein the bit indicates that a page belongs to a block that is the location of a new error block.

12. The system of claim 10, including:
    a restoration component for restoring backed-up data to target memory, including:
    reading all pages from a stripe of backed-up data to target memory, including reading metadata for a stripe embedded in the pages of a preceding LBA; and using the embedded preceding LBA metadata to allow for error blocks in the preceding LBA.

13. The system of claim 10, including:
a grown bad block component for, when an error in a block of flash memory is encountered during back-up of a stripe of data in one or more non-last pages of a logical block address; and wherein
the re-write component re-writes the stripe of data at a page address in the current LBA; and
the metadata component embeds current LBA metadata for the stripe of backed-up data in the re-written stripe of data in the current LBA including an indication of the location of new error block in the current LBA.

14. The system of claim 13, including:
a reporting component for reporting any defects in an LBA including a metadata combining component for combining information in the current LBA metadata of grown bad blocks in a current LBA with the preceding LBA metadata reporting grown bad pages in a next LBA.

15. The system of claim 14, wherein the metadata combining component includes carrying out a logical OR of the current LBA metadata in the form of a grown bad pages bitmap in LBA n with the preceding LBA metadata in the form of a reported bad pages bitmap of LBA n+1.

16. The system of claim 10, wherein one stripe of data is backed-up at a time and the back-up component includes:
sending program commands for a last page address of an LBA and waiting for the status of commands before writing the next stripe;
identifying any new error blocks; and
writing the next stripe in the first page of the next LBA including the preceding LBA metadata.

17. The system of claim 10, wherein m stripes of data are backed up simultaneously, and the back-up component re-writes any of the last m stripes of an LBA that encounter an error are to a new stripe in the next LBA including preceding LBA metadata reporting new error blocks in the last m stripes.

18. A computer program product for reporting defects in a flash memory back-up system, the computer program product comprising a non-transitory computer readable storage medium having program instructions embodied therewith, the program instructions executable by a processor to cause the processor to:
organize backed-up data into multiple stripes of a logical block address (LBA), wherein a stripe is a set of pages across all available flash memory devices which have the same block and page address;
when an error in a block of flash memory is encountered during back-up of a stripe of data in one or more last pages of a logical block address, the method includes:
re-write the stripe of data at a page address in the next LBA; and
embed preceding LBA metadata for the stripe of backed-up data in the re-written stripe of data in the next LBA including an indication of the location of new error block in the preceding LBA.

19. The computer program product of claim 18, wherein the preceding LBA metadata includes a reported bad pages map in the form of a bitmap that has one bit for every page in one or the stripes in the preceding LBA and wherein the bit indicates that a page belongs to a block that is the location of a new error block.

20. The computer program product of claim 18, wherein the one or more last pages are a number of last pages corresponding to a number of pages being written concurrently in a back-up operation.

* * * * *